(12) United States Patent
Kuenzi et al.

(10) Patent No.: US 11,917,520 B2
(45) Date of Patent: Feb. 27, 2024

(54) BLUETOOTH MESH ROUTING WITH SUBNETS

(71) Applicant: Carrier Corporation, Palm Beach Gardens, FL (US)

(72) Inventors: Adam Kuenzi, Silverton, OR (US); Michael Lang, Oregon City, OR (US); Randall Dow, Dallas, OR (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 85 days.

(21) Appl. No.: 16/972,376

(22) PCT Filed: Sep. 10, 2020

(86) PCT No.: PCT/US2020/050055
§ 371 (c)(1),
(2) Date: Dec. 4, 2020

(87) PCT Pub. No.: WO2021/050633
PCT Pub. Date: Mar. 18, 2021

(65) Prior Publication Data
US 2022/0303868 A1    Sep. 22, 2022

Related U.S. Application Data

(60) Provisional application No. 62/898,685, filed on Sep. 11, 2019.

(51) Int. Cl.
*H04W 40/24*    (2009.01)
*H04W 40/02*    (2009.01)
(Continued)

(52) U.S. Cl.
CPC ......... *H04W 40/246* (2013.01); *H04W 40/02* (2013.01); *H04W 4/80* (2018.02); *H04W 84/18* (2013.01)

(58) Field of Classification Search
None
See application file for complete search history.

(56) References Cited

U.S. PATENT DOCUMENTS

| 7,420,952 B2 | 9/2008 | Da Costa et al. |
| 8,102,799 B2 | 1/2012 | Alexander et al. |

(Continued)

FOREIGN PATENT DOCUMENTS

| CN | 207219050 U | | 4/2018 |
| KR | 100853998 | * | 8/2008 |
| WO | WO2004095800 | * | 11/2014 |

OTHER PUBLICATIONS

LEE. IPv6 Stateless Address Auto-configuration in Mobile Ad Hoc Network H.T. Shen et al. (Eds.): APWeb Workshops 2006, LNCS 3842, pp. 360-367, 2006. © Springer-Verlag Berlin Heidelberg 2006 (Year: 2006).*

(Continued)

*Primary Examiner* — Andre Tacdiran
(74) *Attorney, Agent, or Firm* — CANTOR COLBURN LLP

(57) ABSTRACT

A method for communicating amongst a plurality of peripherals within a mesh network including a first subnet and a second subnet including: receiving an advertisement from one or more peripherals of the plurality of peripherals, the advertisement including a hop count, a subnet identifier, and a unique subnet device identifier, the subnet identifier indicating the first subnet or the second subnet and the unique subnet device identifier indicating a specific peripheral of the plurality of peripherals within the mesh network; triggering a message send event; determining a desired stream direction within the mesh network; determining a desired subnet of the mesh network; determining a destination peripheral of the one or more peripherals within the desired subnet and in the desired stream direction in response to the (Continued)

hop count, the subnet identifier, and the unique subnet device identifier; connecting to the destination peripheral; and sending the message to the destination peripheral.

19 Claims, 3 Drawing Sheets

(51) Int. Cl.
*H04W 4/80* (2018.01)
*H04W 84/18* (2009.01)

(56) References Cited

U.S. PATENT DOCUMENTS

| | | | |
|---|---|---|---|
| 8,565,176 | B2 | 10/2013 | Norlén et al. |
| 8,570,168 | B2 | 10/2013 | Logan et al. |
| 8,665,176 | B2 | 3/2014 | Ogita et al. |
| 8,724,513 | B2 | 5/2014 | Hardie |
| 8,774,147 | B2 | 7/2014 | Corinella et al. |
| 8,886,785 | B2 | 11/2014 | Apte et al. |
| 9,113,046 | B2 | 8/2015 | Kannan |
| 9,437,063 | B2 | 9/2016 | Schoenfelder et al. |
| 9,479,894 | B2 | 10/2016 | He |
| 9,521,009 | B1 | 12/2016 | Skeffington |
| 9,585,077 | B2 | 2/2017 | Chan et al. |
| 9,967,884 | B2 | 5/2018 | Emmanuel |
| 10,045,184 | B2 | 8/2018 | Padgett et al. |
| 10,111,071 | B2 | 10/2018 | Polo et al. |
| 10,158,555 | B2 | 12/2018 | Ghosh et al. |
| 10,165,654 | B2 | 12/2018 | Apte et al. |
| 2004/0103282 | A1* | 5/2004 | Meier ............... H04L 9/0891 713/171 |
| 2006/0126611 | A1* | 6/2006 | Kelly ............... H04L 67/104 370/408 |
| 2012/0027008 | A1* | 2/2012 | Chou ............... H04L 45/304 370/352 |
| 2014/0022917 | A1 | 1/2014 | Apte et al. |
| 2018/0206100 | A1 | 7/2018 | Eisner et al. |
| 2019/0141500 | A1 | 5/2019 | Kuenzi et al. |
| 2019/0141616 | A1* | 5/2019 | Kuenzi ............... H04W 40/005 |
| 2019/0182319 | A1 | 6/2019 | Jhanji et al. |
| 2019/0200193 | A1 | 6/2019 | Bae et al. |

OTHER PUBLICATIONS

International Search Report for International Application No. PCT/US2020/050055; dated Nov. 11, 2020; dated Nov. 19, 2020; 4 pages.

Woolley, Martin; Bluetooth Mesh Networking: An Introduction for Developers; 2017 Bluetooth SIG Proprietary; 28 pages.

Written Opinion of the International Searching Authority for International Application No. PCT/US2020/050055; dated Nov. 11, 2020; dated Nov. 19, 2020; 7 pages.

\* cited by examiner

BLUETOOTH MESH ROUTING WITH SUBNETS

CROSS REFERENCE TO RELATED APPLICATIONS

This application claims the benefit of U.S. Application No. 62/898,685, filed on Sep. 11, 2019, which is incorporated herein by reference in its entirety.

BACKGROUND

The subject matter disclosed herein generally relates to the field of computing, and more particularly to mesh networking of wireless messaging devices.

Bluetooth is a popular wireless communication protocol for transmitting data over short distances. Bluetooth is commonly used with today's mobile electronic devices, connecting devices such as headphones, headsets, watches, keyboard, mice, mobile phones, tablets, and sporting equipment. While the above-described devices are a one-to-one connection, there can be a desire to couple together many devices in a mesh network.

BRIEF SUMMARY

According to one embodiment, a method for communicating amongst a plurality of peripherals within a mesh network including a first subnet and a second subnet is provided. The method including: receiving an advertisement from one or more peripherals of the plurality of peripherals, the advertisement including a hop count, a subnet identifier, and a unique subnet device identifier, the subnet identifier indicating the first subnet or the second subnet and the unique subnet device identifier indicating a specific peripheral of the plurality of peripherals within the mesh network; triggering a message send event; determining a desired stream direction within the mesh network; determining a desired subnet of the mesh network, the desired subnet being either the first subnet of the mesh network or the second subnet of the mesh network; determining a destination peripheral of the one or more peripherals within the desired subnet and in the desired stream direction in response to the hop count, the subnet identifier, and the unique subnet device identifier; connecting to the destination peripheral via wireless messaging; and sending the message to the destination peripheral.

In addition to one or more of the features described above, or as an alternative, further embodiments may include that triggering the message send event includes receiving a message.

In addition to one or more of the features described above, or as an alternative, further embodiments may include that the message is a message bundle; and wherein the method further includes: adding information to the message bundle prior to sending the message.

In addition to one or more of the features described above, or as an alternative, further embodiments may include that triggering the message send event includes expiration of an audit timer or an event occurrence.

In addition to one or more of the features described above, or as an alternative, further embodiments may include that data sent after expiration of the audit timer includes: battery status, diagnostic information, entry events, and room temperature.

In addition to one or more of the features described above, or as an alternative, further embodiments may include that the event occurrence includes a door unlocked, a door locked, a door opened, a door closed, or a privacy lock enabled.

In addition to one or more of the features described above, or as an alternative, further embodiments may include that the unique identifier indicates a type of device.

In addition to one or more of the features described above, or as an alternative, further embodiments may include that the type of device is at least one of a door lock, a wireless signal repeater, a thermostat, or a room management system.

According to another embodiment, a sending peripheral of a plurality of peripherals within a mesh network including a first subnet and a second subnet is provided. The sending peripheral including: a processor; and a memory including computer-executable instructions that, when executed by the processor, cause the processor to perform operations, the operations including: receiving an advertisement from one or more peripherals of the plurality of peripherals, the advertisement including a hop count, a subnet identifier, and a unique subnet device identifier, the subnet identifier indicating the first subnet or the second subnet and the unique subnet device identifier indicating a specific peripheral of the plurality of peripherals within the mesh network; triggering a message send event; determining a desired stream direction within the mesh network; determining a desired subnet of the mesh network, the desired subnet being either the first subnet of the mesh network or the second subnet of the mesh network; determining a destination peripheral of the one or more peripherals within the desired subnet and in the desired stream direction in response to the hop count, subnet identifier, and the unique subnet device identifier; connecting to the destination peripheral via wireless messaging; and sending the message to the destination peripheral.

In addition to one or more of the features described above, or as an alternative, further embodiments may include that triggering the message send event includes receiving a message.

In addition to one or more of the features described above, or as an alternative, further embodiments may include that the message is a message bundle; and wherein the method further includes: adding information to the message bundle prior to sending the message.

In addition to one or more of the features described above, or as an alternative, further embodiments may include that triggering the message send event includes expiration of an audit timer or an event occurrence.

In addition to one or more of the features described above, or as an alternative, further embodiments may include that data sent after expiration of the audit timer includes: battery status, diagnostic information, entry events, and room temperature.

In addition to one or more of the features described above, or as an alternative, further embodiments may include that the desired stream direction is downstream and the destination peripheral has a hop count greater than the hop count of the sending peripheral.

In addition to one or more of the features described above, or as an alternative, further embodiments may include that the desired stream direction is upstream and the destination peripheral has a hop count less than the hop count of the sending peripheral.

In addition to one or more of the features described above, or as an alternative, further embodiments may include that the sending peripheral is a door lock, a wireless signal repeater, a thermostat, or a room management system.

In addition to one or more of the features described above, or as an alternative, further embodiments may include that the event occurrence includes a door unlocked, a door locked, a door opened, a door closed, or a privacy lock enabled.

In addition to one or more of the features described above, or as an alternative, further embodiments may include that the unique identifier indicates a type of device.

In addition to one or more of the features described above, or as an alternative, further embodiments may include that the type of device is at least one of a door lock, a wireless signal repeater, a thermostat, or a room management system.

Technical effects of embodiments of the present disclosure include organizing a mesh network of peripherals into two or more subnets and directing messages through specific subnets.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

Figure 1:
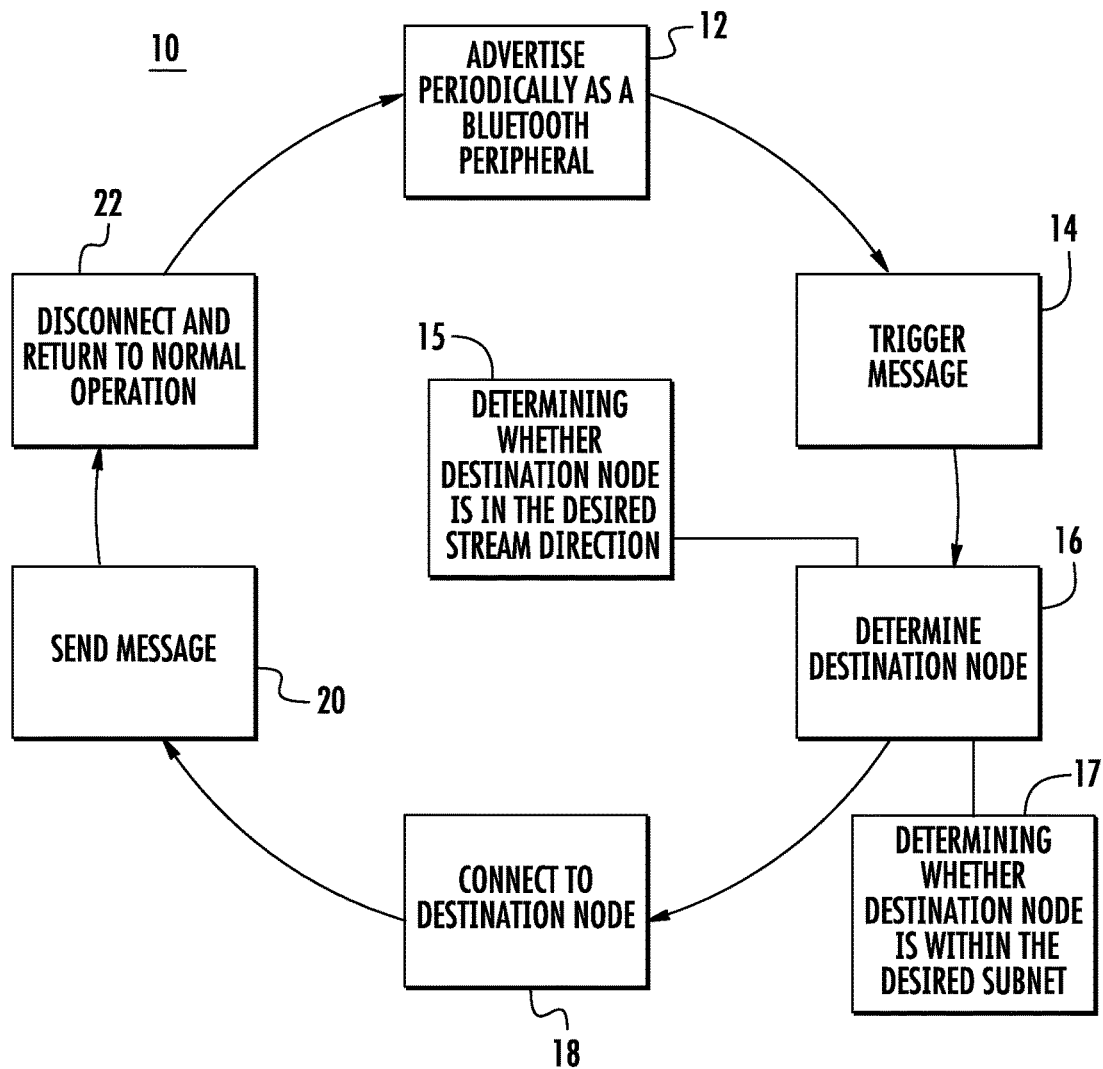
FIG. 1 is a flowchart illustrating the operation of one or more embodiments, in accordance with an embodiment of the disclosure.

A detailed description of one or more embodiments of the disclosed apparatus and method are presented herein by way of exemplification and not limitation with reference to the Figures.

As described above, Bluetooth is a wireless protocol commonly used to couple together electronic devices. Because the electronic devices that use Bluetooth might be portable, those devices typically use batteries to power the Bluetooth connectivity. While some embodiments are described herein with respect to Bluetooth, it should be understood that embodiments can be used with any type of wireless messaging protocol, such as Wi-Fi, ZigBee, Z-Wave, or any wireless protocol currently in existence or developed in the future.

A mesh network is a network topology that includes multiple nodes. Different types of mesh networks are discussed within U.S. Non-Provisional application Ser. No. 16/181,565 filed Nov. 6, 2018, U.S. Non-Provisional application Ser. No. 16/184,118 filed Nov. 8, 2018, PCT Application PCT/US2019/028703 filed Apr. 23, 2019, PCT Application PCT/US2019/028757 filed Apr. 23, 2019, EP Application EP19181647.9 filed Jun. 21, 2019, and EP Application EP19181733.7 filed Jun. 21, 2019, which are incorporated herein by reference in their entirety.

Each node in the mesh network relays data for the mesh network. All the nodes cooperate in the distribution of data in the mesh network. The nodes may be organized in to multiple different mesh network subnets. Advantageously, by organizing the mesh network into mesh network subnets, data exclusive to a particular subnet may be sent exclusively in the subnet, thus speed up communication times within the subnet and saving power by not transferring these messages out of the subnet. Also advantageously, if there is congestion in one subnet, it would not affect data routing within a second subnet. Also advantageously, if there is a centralized system that communicates with all subnets is unavailable, the subnet could still operate as a unit for a subset of system functionality. Also advantageously, roles within a subnet could be predefined based on the subnet ID allowing messages to be addressed to specific device types based on the subnet ID. This subnet ID eliminates the need for predefined routes within the subnet as direction can be determined by the combination of hop count and subnet ID.

A message in a mesh network travels from a source node to a destination node, possibly by "hopping" through intermediate routing nodes. A node may be a source node, a destination node, a routing node or any combination of these. The performance of a mesh network may be related to the number of hops between the source node and the destination node and to how quickly a message can be transmitted through routing nodes. The number of hops between the source node and the destination node may be counted within a single subnet of the mesh network.

Some mesh networks utilize intermediate routing nodes to reduce message latency. A routing node is an extra device used specifically to route messages in a mesh network (in other words, they do not typically serve as a source node or a destination node). These routing nodes are generally highly available and ready to route a message for the quickest possible latency. These routing nodes are typically powered devices, because the power consumption required to be highly available is detrimental to battery life (because radio receivers consume a large amount of energy). When a source node generates a message, it can quickly connect and send messages through a routing node. However, in order to receive a message, a node must periodically check-in or otherwise synchronize to a timing signal from a routing node at regular intervals. The length of the regular interval is a key factor in determining the overall message delivery latency and also in determining battery life of the destination node.

In one or more embodiments, peer-to-peer messages are used to create a mesh network for sending messages without the use of intermediate routing nodes. When needed, each node in the mesh network switches between being a source, a destination, or a routing node. A node periodically advertises its availability by waking up briefly to advertise, be available, and then return to a sleep mode. If a source node connects during the short available period and passes a message along, the node will handle the message by determining that it is the destination, or by routing the message on to another destination node. Thereafter, the node again returns to sleep mode until its next scheduled available period. This allows the source node to be in a routing mode only when it has a message to send and only for as long as it takes to identify a destination node. The result is a mesh network implemented without the use of a powered intermediate routing node where the battery life of each node can be tuned relative to the message delivery latency by increasing or decreasing the advertising availability.

A flowchart illustrating method 10 is presented in FIG. 1. Method 10 is merely exemplary and is not limited to the embodiments presented herein. Method 10 can be employed in many different embodiments or examples not specifically depicted or described herein. In some embodiments, the procedures, processes, and/or activities of method 10 can be performed in the order presented. In other embodiments, one or more of the procedures, processes, and/or activities of method 10 can be combined or skipped. In one or more embodiments, method 10 is performed by a processor as it is executing instructions.

Method 10 illustrates the steps taken by a node within a mesh network that begins by operating as a single Bluetooth peripheral and where the mesh network includes multiple other nodes also operating as Bluetooth peripherals. Although the use of Bluetooth for communication is discussed, it should be understood that any type of wireless communication protocol can be used. The node advertises itself (block 12) as a Bluetooth peripheral. This advertising can comprise a periodic Bluetooth advertising message that indicates that the node is available and ready to be connected to by another node. The advertisement may include a mesh network subnet identifier that the node may belong to and a hop count explained further herein. The node does not itself connect and communicate with other nodes unless there is a message to send. When there is a message to send the node assumes the role of Bluetooth central until the message is sent and then returns to Bluetooth peripheral mode. Thus, most of the time when operating as a Bluetooth peripheral, the node is only awake for a brief period of time when advertising (a first time period) prior to being turned off, or to a sleep state, for a second time period. Typically, the second time period is longer than the first time period. The first and second time period can be adjusted. The battery life is related to the second time period, as a longer second time period leads to a longer battery life because the peripheral is consuming much less energy during the second time period than it consumes by advertising during the first time period. However, a longer second time period can result in lower latency, as will be described below. By making the second time period adjustable, a user can balance battery life with latency. Because each node in the network spends most of its time operating as a Bluetooth peripheral, and only assumes the Bluetooth central role when a message needs to be transmitted, the node is generally referred to herein as a peripheral.

When a peripheral has data to be sent, a message send event occurs at block 14. A desired stream direction (e.g., upstream or downstream) within the mesh network may be determined from the message send event. For example, the desired stream direction may be that the message is require to be sent upstream within the mesh network or downstream within the mesh network. A desired subnet within the mesh network may be determined from the message send event. As aforementioned, nodes may be organized in to multiple different mesh network subnets and one subnet may be desired over another.

A peripheral can have data to be sent for a variety of reasons. For example, the data to be sent might originate with the peripheral. In another example, the peripheral can receive data from another node in the mesh network and desire to forward the data to another node in the mesh network. Either of these situations can be considered a trigger message. A message contains the data to be sent from one node in the mesh to another. The words data, information, and message are used interchangeably herein but essentially mean the same thing, however more specifically a message will contain data that encodes information. The message is transferable from one node to another. The data can be processed by a receiving node to determine the information. In addition to a message containing data, the message may contain additional data that is an indication of the source node, source node subnet association, final destination node, routing information, priority information, message integrity information or other information typically transferred in a digital message. Data contained in messages may be encrypted using various methods well known in the art of message delivery.

When the peripheral has data to send, it determines a destination node (block 16). The additional data contained in the message can be used to determine the destination node. Also, if the trigger (block 14) occurs within a peripheral, determining the destination (block 16) may be using a pre-programmed destination that may be configured in the peripheral and associated with the type of trigger. Some data from the peripheral may need to be sent to a central node. Other data from the peripheral may need to be sent to another destination node. The destination node may be the final destination for the message or it may be a receiving node as the next step in the route on the way to a final destination node. In some embodiments, the peripheral can operate briefly as a Bluetooth central and perform a Bluetooth scan to find a receiving node operating as a peripheral within the same mesh network subnet. The scan can detect an advertisement of the receiving peripheral, where the advertisement is similar to the advertisement of block 12. By comparing received advertisements from nearby peripherals that include a subnet identifier and a hop count, the receiving node can be determine without the need for a routing table.

When the sending peripheral detects the receiving peripheral within the same mesh network subnet, the sending peripheral node determines that the receiving peripheral is within the same mesh network subnet (block 17) and determines whether the receiving peripheral is upstream or downstream of the sending peripheral from the hop count (block 15). The mesh network subnet of the receiving peripheral may be determined from the advertisement of the receiving peripheral. Additionally, whether or not the peripheral is upstream or downstream of the sending peripheral would be indicative of whether will be sent in the desired stream direction (e.g., upstream or downstream).

When the sending peripheral detects the receiving peripheral is within the same mesh network subnet and in the desired stream direction, the sending peripheral node, again temporarily operating as a Bluetooth central, establishes a connection with the receiving peripheral node within the same mesh network subnet, which is operating as a Bluetooth peripheral (block 18). In some embodiments, the detection occurs when the sending peripheral detects the receiving peripheral's advertisement. Latency is the delay that occurs between when the sending peripheral first attempts to send the data at block 16 and when the peripheral finally connects with the receiving peripheral at block 18.

Once the connection is established, the peripheral sends the data to the receiving peripheral (block 20). Thereafter, the peripheral disconnects and returns to normal operation again as a Bluetooth peripheral (block 22). At this point, the receiving node may utilize method 10 to also transfer the message to yet another node in the same mesh network subnet.

A mesh network utilizing method 10 takes advantage of the fact that each peripheral in the mesh network is only on for a very short period of time during the advertisement phase (block 12) and is off for longer periods of time. In some embodiments, the length of the advertisement phase (the first time period) is on the order of 5 milliseconds and is just long enough to send one Bluetooth advertisement on each advertising channel, while the length of the idle phase (the second time period) is on the order of 1 second. While a long idle phase might not be feasible in some Bluetooth connections (for example, a headset, a keyboard, or mouse needs to transmit data much more often), other types of peripherals can greatly benefit from such a mesh network. Particularly included in this category are peripherals that only need to transmit data relatively rarely. One such peripheral can include door locks, as will be described in further detail below.

The above described method uses less battery power because each peripheral in the mesh network is only "on" for a short period of time-if there is no data to transmit, the peripheral turns off again. There is also no need of a synchronized clock between a node and a routing node which lessens the power requirement of each peripheral. The clocks do not need to be synchronized, because, when data needs to be sent, a peripheral merely searches for an advertisement signal from a neighboring peripheral, then begins transmission. Because the advertisement signals are periodic from each node, the additional time required to scan for the next advertisement adds an understood and minimal amount to the message latency in a way that is tunable by the time period. Thus, each hop or transmission of a message from one node to another will add time to the overall message latency corresponding to the amount of the second time period. In one example embodiment, if the second time period is 1 second, then on average it will take ½ of the second time period, or ½ second to detect the receiving peripheral and then 1 more second to connect to the receiving peripheral on its next available period. Further in this example, if a message requires 5 hops to get from a source to a destination, the overall message latency would be 5 times the single hop latency, or 5 times ½ second, or a total of 2.5 seconds of time to get from the source to the destination. By increasing or decreasing the second time period, this overall latency can be tuned to be faster or slower with the tradeoff being the battery life. Thus, synchronizing the time period between advertisement signals is not required for the purpose of ensuring latency when sending or receiving messages. In some embodiments, some messages can be held by a peripheral for a period of time, while other messages (termed "exceptions") should be sent immediately upon the generation of the message. Each of the peripherals can be considered a "peer". Thus, the mesh of peripherals can be considered a peer-to-peer network.

The above method can also be advantageously applied in situations where peripherals are required to be available for connection to a mobile device. An example is a mobile phone being used to open a hotel lock. In this example, the hotel lock may be periodically advertising as a Bluetooth peripheral so that it is available for connection at any time by a mobile device in order for a guest to open their hotel room door. In this example, a mesh network can easily be added to the hotel door locks without requiring any additional Bluetooth operation by the door lock except for when a message is triggered (block 14) to be sent or routed (blocks 16, 18, and 20). If a traditional mesh network topology was used, either expensive routing nodes would be installed within range of all door locks or an additional wireless protocol would be added to communicate with routing nodes. The advantage of this method is the simplicity of operation of the network and its optimization for balancing between battery life and message latency.

Figure 2:
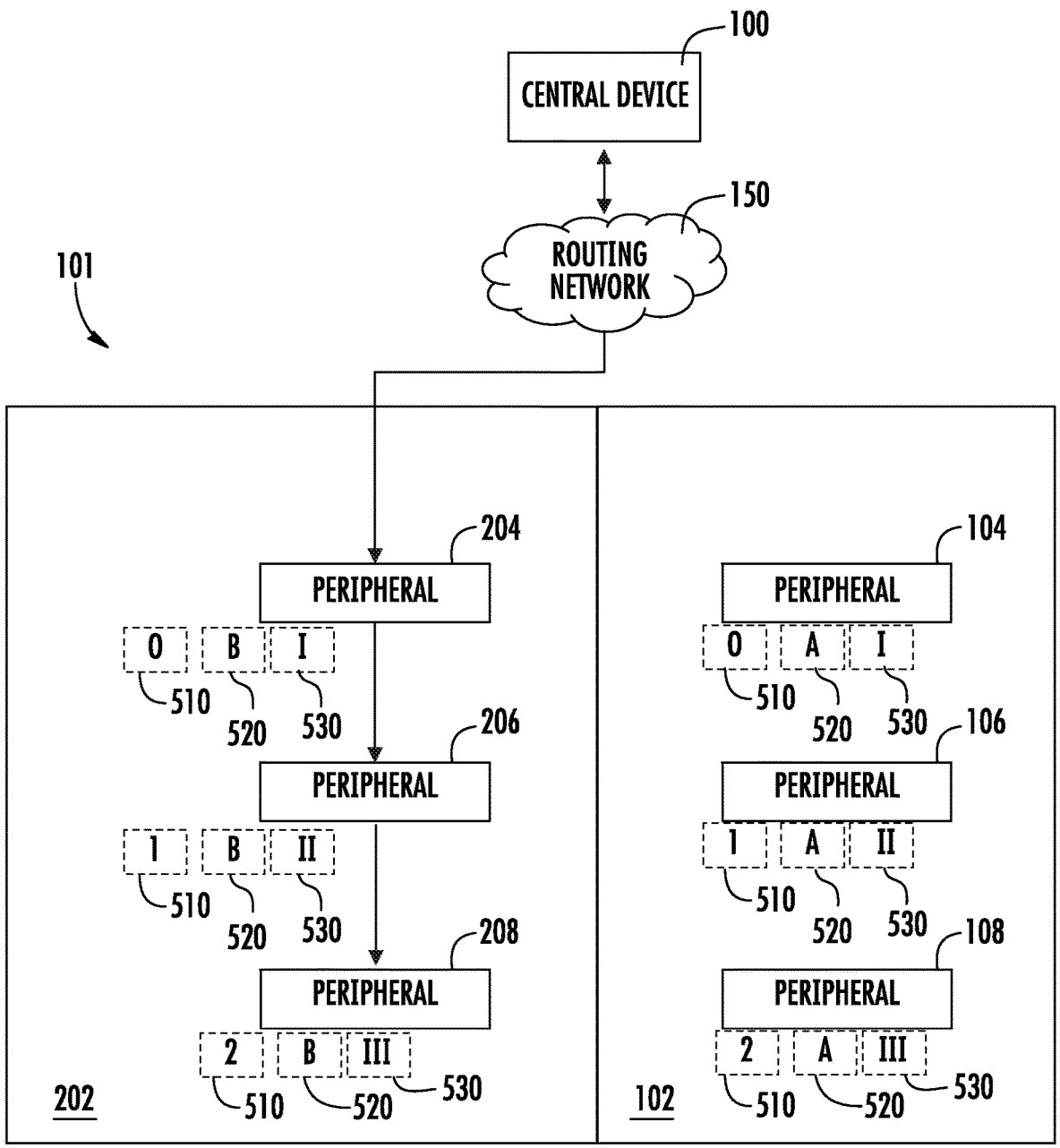
FIG. 2 is a block diagram illustrating a downstream message in a subnet of a mesh network, in accordance with an embodiment of the disclosure.

With reference to FIG. 2, sending a message downstream in a mesh network 101 having multiple subnets 102, 202 that each include multiple peripherals is presented. Mesh network 101 includes a first subnet 102 and a second subnet 202. Mesh network 101 includes peripherals 204, 206, 208 and peripherals 104, 106, 108. The first subnet 102 includes peripheral 104, peripheral 106, and peripheral 108. The second subnet 202 includes peripheral 204, peripheral 206, and peripheral 208. Mesh network 101 can also include a central device 100. Central device 100 can be any type of device that is used to communicate with each of peripherals 204, 206, 208 and peripherals 104, 106, 108. In some embodiments, central device 100 can include database capabilities, in order to store data transmitted by peripherals 204, 206, 208 and peripherals 104, 106, 108. In some embodiments, central device 100 can include programming capabilities such that central device 100 can produce instructions for any one of peripherals 204, 206, 208 and peripherals 104, 106, 108. Central device 100 can be embodied as a laptop computer, a desktop computer, a server, a cloud, a mobile electronic device, or any other type of computing device. While 14 peripherals are illustrated in FIG. 2, it should be understood that a greater or lesser number of peripherals can be present in other embodiments. In an embodiment, the subnets 102, 202 are each separate rooms and the peripherals 204-208, 104-108 represent different devices within each separate room.

With continued reference to FIG. 2, the transmission of data through mesh network 101 is illustrated. In this example, central device 100 wants to send information to peripheral 208. The central device 100 sends the information to peripheral 204 through a network connection 150. The network connection 150 may be a computer network (e.g., LAN connection) and/or a powered device that provides access to the computer network. The network connection provides high speed communications between the central device 100 and a head node or peripheral of the mesh network 101, whereas the communication between the network connection 150 and mesh network 101 is using method 10 in FIG. 1. There may be a head peripheral for each subnet. In FIG. 2, the head peripherals are peripheral 204 and peripheral 104. The communication of the network connection 150 may be via a high-speed network. The high-speed networks may be wireless, for example Wi-Fi, Cellular, or the like. High-speed networks may also be wired, for example Ethernet, fiber optic, or the like. In general, the high-speed network is of a type typically installed as a data communications network in a building, between buildings, or as available for communications with mobile equipment.

The central device 100 sends information (e.g., messages) to nodes or peripherals of the mesh network. Each message has a "from address" and a "to address" and by using the address each message can be routed from the source to the destination. Each node or peripheral in the mesh network 101 has a unique address. The address is composed of two parts including a subnet identifier 520 and a unique subnet device identifier 530.

The central device 100 sends information (e.g., messages) through the network connection to the head node or head peripheral in each subnet. If a message is destined for a particular peripheral in a particular subnet, the central device 100 sends it to subnet head peripheral. The subnet is determined by the address which parses into the subnet identifier 520 and the unique subnet device identifier 530. The unique subnet device identifier 530 could be a predefined value for peripherals that are the 'head peripheral' of each subnet. For example, this pre-fined value for peripherals that are the 'head peripheral' may be "1", as illustrated in FIG. 2. The central device 100 may have an IP address or some other means to identify exactly how to reach a particular 'head peripheral'. Alternatively, it may send the message to all 'head peripheral' and the one responsible peripheral will route the data onto their subnet.

The arrows in FIG. 2 show an exemplary path of the information. In FIG. 2, data or information (i.e., a message) may be sent from the central device 100 to the destination node or destination peripheral, which is peripheral 208 in FIG. 2. The central device 100 may identify the destination node or the destination peripheral by including the subnet identifier 520 and the unique subnet device identifier 530 in the data to be sent.

Peripheral 204 follows the method 10 shown in FIG. 1. For a second period of time, peripheral 204 is off, or unavailable. During a first period of time, peripheral 204 advertises its availability, hop count 510, subnet identifier 520, and unique subnet device identifier 530. The hop count 510 is the number of hops or peripherals away from peripheral nearest the network connection 150 within the respective subnet. In the example shown in FIG. 2, peripheral 104 is nearest the network connection 150 within the first subnet 202 and thus peripheral 104 has a hop count 510 equal to 0 within the first subnet 102. Peripheral 106 has a hop count 510 equal to 1 within the first subnet 102. Peripheral 108 has a hop count 510 equal to 2 within the first subnet 102. In the example shown in FIG. 2, peripheral 204 is nearest the network connection 150 within the second subnet 202 and thus peripheral 204 has a hop count 510 equal to 0 within the second subnet 202. Peripheral 206 has a hop count 510 equal to 1 within the second subnet 202. Peripheral 208 has a hop count 510 equal to 2 within the second subnet 202.

The peripherals 104, 106, 108 of the first subnet 102 may each have a subnet identifier 520 of "A". The peripherals 204, 206, 208 of the second subnet 202 may each have a subnet identifier 520 of "B". The subnet identifier 520 may be a title or nomenclature that identifies the particular subnet and differentiates the particular subnet from other subnet. It is understood that subnet identifiers 520 of "A" and "B" are exemplary and subnets 102, 202 may have different subnet identifiers 520.

All peripheral devices in a subnet may be assigned a unique subnet device identifier that allows each peripheral device to be uniquely identified within its subnet. The peripheral 104 of the first subnet 102 may have a unique subnet device identifier 530 of "I". The peripheral 106 of the first subnet 102 may have a unique subnet device identifier 530 of "II". The peripheral 108 of the first subnet 102 may have a unique subnet device identifier 530 of "III". The peripheral 204 of the second subnet 202 may have a unique subnet device identifier 530 of "I". The peripheral 206 of the second subnet 202 may have a unique subnet device identifier 530 of "II". The peripheral 208 of the second subnet 202 may have a unique subnet device identifier 530 of "III". It is understood that unique subnet device identifiers 530 of "I", "II", "III" are exemplary and peripheral devices 104, 106, 108, 204, 206, 208 may have different subnet device identifiers 530.

Advantageously, the combination of the subnet identifier 520 and the unique subnet device identifier 530 provides unique and independent identification of every peripheral device within the mesh network 101.

Additionally, specific unique subnet device identifier 530 values (e.g., "I", "II", "III") may be assigned to specific device types. For example, subnet device identifier 530 "I" may be assigned to thermostats within the mesh network 101, subnet device identifier 530 "II" may be assigned to wireless signal repeaters in the mesh network 101, and subnet device identifier 530 "III" may be assigned to door locks in the mesh network 101. This allows the device type to be identified based on its unique subnet device identifier 230.

As aforementioned during the first period of time, peripheral 204 advertises its availability, hop count 510, subnet identifier 520, and unique subnet device identifier 530. During this first time period, central device 100 establishes communication with peripheral 204, identifies the subnet of the peripheral 204, and transmits data to peripheral 204 through the network connection 150. Thereafter, this triggers peripheral 204, block 14 in FIG. 1, to search for another peripheral to send the data to within the same subnet as peripheral 204 (i.e., the second subnet 202). It eventually finds peripheral 206 and ignores peripherals outside of the same subnet, even though the adjacent devices may be within Bluetooth range (i.e. 104 and 106). The above-described steps are undertaken and peripheral 206 receives the data. This process is repeated for the transmission of data from peripheral 206 to peripheral 208. As the final destination peripheral, peripheral 208 can then process, store, or otherwise use the data that was originally transmitted by central device 100. As aforementioned, peripheral 208 was originally identified by the central device 100 as the destination peripheral by including the subnet identifier 520 and the unique subnet device identifier 530 in the data sent by the central device 100.

In some embodiments, peripheral 208 can send an acknowledgement back to central device 100 such that central device 100 can verify that the data was received by the destination peripheral. The above-described path also can be used to transmit data from central device 100 to each of the peripherals 204, 206, 208. For example, a universal configuration can be sent in such path. In another example, a query can be sent to each of the peripherals 204, 206, 208 (or subset thereof) in order to determine which peripheral meets a certain criteria. The above described path would have 3 hops and the overall latency would be determined as described above where the time required for each hop is related to the second time period.

For data that is specific to a certain peripheral, it should be understood that other paths can be chosen. In some embodiments, the information can be in the form of a "message bundle." Instead of a message consisting of a single instruction for a specific peripheral (or all peripherals), a message from one peripheral can be appended to a message from another peripheral prior to being forwarded. A variety of different formats can be used for the message bundle. For example, there can be a portion of the message that notes the sending peripheral, followed by the message. Thus, a message from peripheral 204 can include "204" followed by the information. If peripheral 206 wanted to append to the message bundle, the resulting message bundle could include "204" followed by the information followed by "206," followed by its information.

Figure 3:
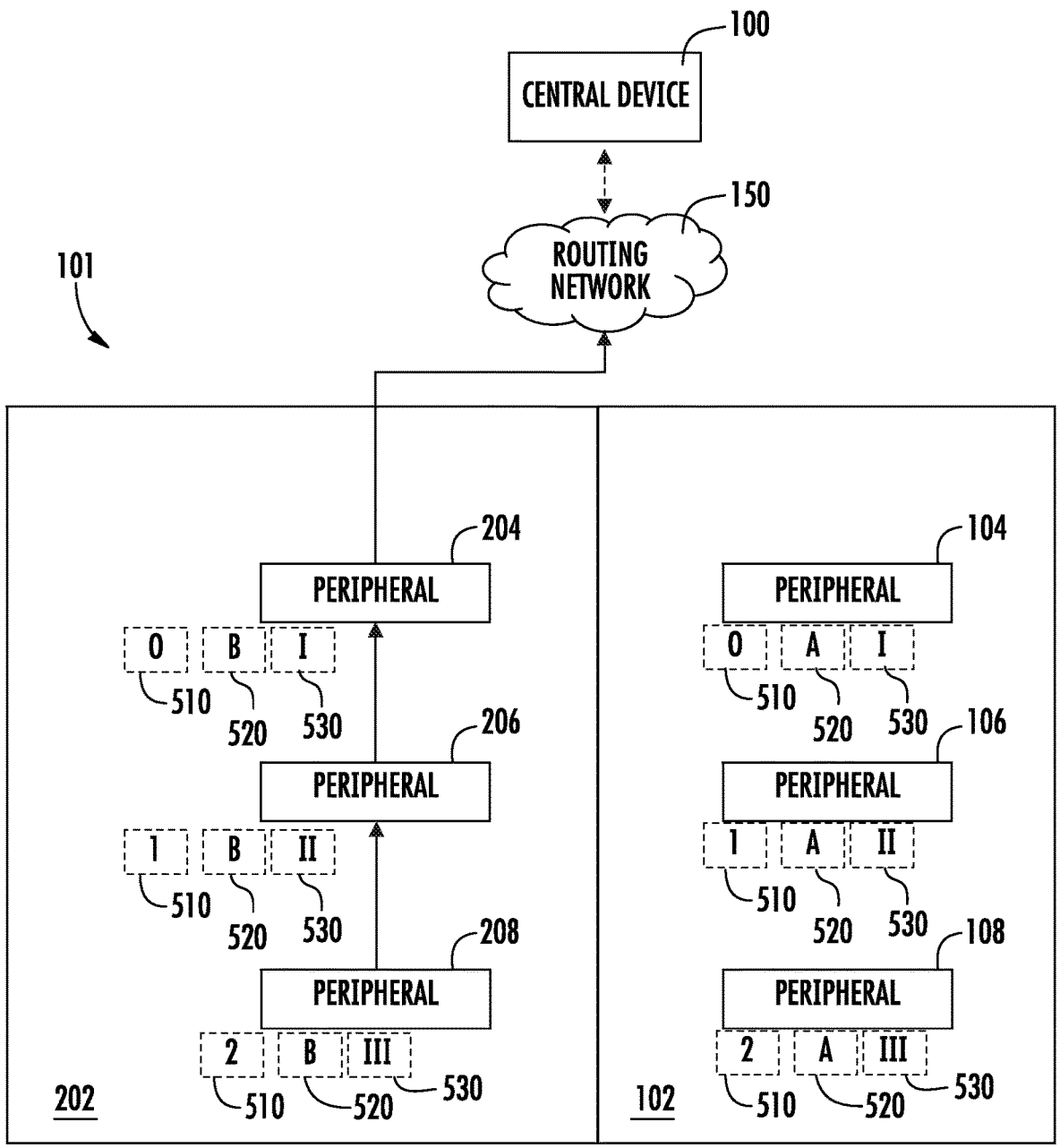
FIG. 3 is a block diagram illustrating a upstream message in a subnet of a mesh network, in accordance with an embodiment of the disclosure.

With reference to FIG. 3, sending a message upstream in a mesh network 101 having multiple subnets 102, 202 that each include multiple peripherals is presented. In the example of FIG. 3, a peripheral 208 is attempting to send a message upstream to central device 100. While only 6 peripherals 204, 206, 208, 104, 106, 108 are illustrated in FIG. 3, it should be understood that a greater number of peripherals can be present in other embodiments.

Peripheral 208 sends the data to peripheral 206, using method 10 such as that described with respect to FIG. 1. Specifically, peripheral 208 performs block 14 in FIG. 1, to search for another peripheral to send the data upstream to within the same subnet as peripheral 204 (i.e., the second subnet 202). A lower hop number 510 than the hop number of the peripheral 208 will indicate that the peripheral is upstream from peripheral 208. Peripheral 208 may receive advertisements from peripheral 108 and subsequently ignore advertisements from peripheral 108 because peripheral 108 has a different subnet identifier 520 than peripheral 208 and an equivalent hop count 510 to peripheral 208. Peripheral 208 eventually finds peripheral 206, which has a lower hop number 510 and a subnet identifier 520 indicating that peripheral 206 is in the same subnet as peripheral 208 (i.e., the second subnet 202). The above-described steps are undertaken and peripheral 206 receives the data. This process is repeated for the transmission of data from peripheral 206 to peripheral 208. As the final destination peripheral, peripheral 208 can then process, store, or otherwise use the data that was originally transmitted by central device 100. In some embodiments, peripheral 208 can send an acknowledgement back to central device 100 such that central device 100 can verify that the data was received by the destination peripheral.

Peripheral 206 also may have data to send to central device 100. After peripheral 206 receives the data from peripheral 208, peripheral 206 may append the data it wants to send to central device 100 to the data it received from peripheral 208. This message bundle of data is then transmitted by peripheral 208 to the next device. As illustrated by the solid arrows, the message bundle is sent to peripheral 204 before being sent to central device 350. It should be understood that the message bundle is sent from one peripheral to the next peripheral using techniques illustrated in FIG. 1. It should be understood that, although only a single peripheral (peripheral 206) adding to the message bundle is discussed, any number of peripherals can add to the message bundle. For example, in an embodiment where each peripheral sends a periodic status update, each peripheral can add their status to the message bundle before sending the message bundle to the next peripheral. By using the message bundle, the total number of messages transmitted throughout the mesh network is reduced.

In one embodiment, data may be required to stay within the same subnet. In another embodiment, data may not be required to stay within the same subnet but rather one subnet of a mesh network 101 may be given priority (e.g., priority subnet) and the data (e.g., message) may be sent outside of the priority subnet in specific instances. For example, if a subnet node in the priority subnet cannot be identified, then the data may be sent outside of the priority subnet in order to send the message on. Traveling outside of the priority subnet may be allowed for data going to the central device 100, whereas data going to the 'head node' of the priority subnet may be required stay within the priority subnet. For example, if peripheral 208 would like to send data to the central device 100 and the second subnet 202 is the priority subnet, it would be OK for the data to go outside of the second subnet 202, as long as the data is sent to the central device 100. In another example, if peripheral 208 would like to send data to peripheral 204 and the second subnet 202 is the priority subnet, the data may be required to stay within the second subnet 202, so that the data routing is not effected by congestion or outages within other parts of the mesh network 101. Referring now to FIGS. 2 and 3. The above described mesh network in FIGS. 2 and 3 can be used with respect to door locks, thermostats, room management systems, and/or wireless signal repeaters. For example, a hospitality entity (such as a hotel, motel, or resort), can use one or more of the above described embodiments to maintain the door locks of the entity. In an embodiment, peripherals 104, 204 may be thermostats. In an embodiment, peripherals 106, 206 may be wireless signal repeaters. In an embodiment, peripherals 108, 208 may be door locks. In an embodiment, central device 100 may be a computing device located at a front desk of a hotel.

In such an embodiment where one or more of the peripherals (e.g., peripherals 108, 208) are door locks and the central device can be a computer system that is accessible by a variety of hotel employees, such as reservations, the front desk, housekeeping, and security. There are a variety of operations that can be performed from a central device to a door lock. For example, the front desk of a hotel might desire to reprogram a door lock to accept a certain key card or to not accept a certain key card or to accept an entry via a mobile electronic device (such as a smartphone). In such a case, the front desk of the hotel would use their computer system to direct the central device to issue an instruction to the correct door lock.

Information from the door locks to the central device might be sent more rarely. There can be audit information transmitted from each door lock to the central device. The audit information can include information as to when the door lock was accessed, by which card was the lock accessed, and at what time.

The information may be transmitted in real-time (e.g., directly after events have occurred) in response to an event occurrence or after the expiration of an audit timer. An event occurrence may include but is not limited to a door unlocked, a door locked, a door opened, a door closed, or a privacy lock enabled. An event occurrence may include any event that is communicated to both other devices within the subnet and the central device 100.

Because the timeliness of the audit information might not be of high importance to the hospitality entity, it might not be desirable to send this type of information every time the door lock is used. By reducing the number of times this type of information is sent to the central device, the battery life of each door lock is lengthened. In such a situation, each of the door locks can contain a memory and use the memory to store the audit information. Thereafter, in a periodic manner (such as twice a day) based on expiration of an audit timer, the door lock sends its audit information to the central device, using the embodiments described herein. Other type of information that could be treated as "store and forward" type of information includes battery status, diagnostic information, how long a guest was in the room, the time of use of each lock, room temperature, and each time the room was accessed by staff.

The central device also can send information to all of the door locks at regular intervals, such as calendar date and time synchronization information or instructions to send audit information or diagnostic information. Another type of information that can be sent from the central device to each of the door locks is information that is used by each door lock, such as information to deactivate a master key. Such information is needed by each door lock in the mesh network, so it would be sent in a broadcast format. A broadcast format is a type of message bundle in which each door lock not only retrieves and uses the information, but also forwards the message bundle to the next message bundle.

There can be certain types of information that is sent immediately from the door locks to the central device. This information can be called "exceptions." One example of an exception is an unauthorized entry. For example, if the key a room of the first subnet 102 is used for a room of the second subnet, an exception can be generated and the information is immediately sent to the central device. A similar situation can occur if a master key is used when it is not supposed to be used. For example, a housekeeper who is supposed to be cleaning floor 5 uses her key card to open a door on floor 4. Other type of information that is treated as an exception can include a door being held open for a long period of time, a locking plan change (e.g., when each key card is set to automatically expire after checkout).

The central device can also send a query to the door locks to request information. For example, if the central device wants to know the last time a specific master key was used, it can send a query to each door lock in the mesh network (or subset thereof). The response to the query can be treated in the same manner as an exception in that the response is immediately transmitted to the central device, as opposed to being stored in the door lock for later transmission during the periodic audit.

There are certain types of messages that may originate in one door lock to be sent to another door lock or to another device that is participating in the peer-peer mesh network without having the central device involved. For example, a door lock could send a message indicating that a guest just entered the room to a thermostat or similar device that is part of a room management system. In response to receiving the data, the thermostat could operate to a set point for comfort rather than for a set point for energy savings. Further, in this example the thermostat or room management device could also operate as a gateway device network connection 150 as shown in FIGS. 2 and 3 with a high-speed connection to the central device 100 also as shown in FIGS. 2 and 3. Other example types of devices that originate messages may include sensors, such as smoke detectors, occupancy sensors, door sensors or the like to mention a few non-limiting examples. Other examples of gateway devices could include lighting systems, lighted exit signs, wireless network routers, to mention a few non-limiting examples.

As described above, embodiments can be in the form of processor-implemented processes and devices for practicing those processes, such as processor.

Embodiments can also be in the form of computer program code (e.g., computer program product) containing instructions embodied in tangible media, such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for communicating amongst a plurality of peripherals within a mesh network comprising a first subnet and a second subnet, the method comprising:
    receiving an advertisement from one or more peripherals of the plurality of peripherals, the advertisement including a hop count, a subnet identifier, and a unique subnet device identifier, the subnet identifier indicating the first subnet or the second subnet and the unique subnet device identifier indicating a specific peripheral of the plurality of peripherals within the mesh network;
    triggering a message send event;
    determining a desired stream direction within the mesh network;
    determining a desired subnet of the mesh network, the desired subnet being either the first subnet of the mesh network or the second subnet of the mesh network;
    determining a destination peripheral of the one or more peripherals within the desired subnet and in the desired stream direction in response to the hop count, the subnet identifier, and the unique subnet device identifier;
    connecting to the destination peripheral via wireless messaging; and
    sending a message to the destination peripheral.

2. The method of claim 1, wherein triggering the message send event comprises receiving a message.

3. The method of claim 1 wherein:
    the message is a message bundle; and wherein the method further comprises:
    adding information to the message bundle prior to sending the message.

4. The method of claim 1, wherein:
    triggering the message send event comprises expiration of an audit timer or an event occurrence.

5. The method of claim 4, wherein:
    data sent after expiration of the audit timer includes: battery status, diagnostic information, entry events, and room temperature.

6. The method of claim 4, wherein:
    the event occurrence includes a door unlocked, a door locked, a door opened, a door closed, or a privacy lock enabled.

7. The method of claim 1, wherein:
the unique identifier indicates a type of device.

8. The method of claim 7, wherein the type of device is at least one of a door lock, a wireless signal repeater, a thermostat, or a room management system.

9. A sending peripheral of a plurality of peripherals within a mesh network comprising a first subnet and a second subnet, the sending peripheral comprising:
a processor; and
a memory comprising computer-executable instructions that, when executed by the processor, cause the processor to perform operations, the operations comprising:
receiving an advertisement from one or more peripherals of the plurality of peripherals, the advertisement including a hop count, a subnet identifier, and a unique subnet device identifier, the subnet identifier indicating the first subnet or the second subnet and the unique subnet device identifier indicating a specific peripheral of the plurality of peripherals within the mesh network;
triggering a message send event;
determining a desired stream direction within the mesh network;
determining a desired subnet of the mesh network, the desired subnet being either the first subnet of the mesh network or the second subnet of the mesh network;
determining a destination peripheral of the one or more peripherals within the desired subnet and in the desired stream direction in response to the hop count, subnet identifier, and the unique subnet device identifier;
connecting to the destination peripheral via wireless messaging; and
sending a message to the destination peripheral.

10. The sending peripheral of claim 9, wherein triggering the message send event comprises receiving a message.

11. The sending peripheral of claim 9, wherein:
the message is a message bundle; and wherein the method further comprises:
adding information to the message bundle prior to sending the message.

12. The sending peripheral of claim 9, wherein:
triggering the message send event comprises expiration of an audit timer or an event occurrence.

13. The sending peripheral of claim 12, wherein:
data sent after expiration of the audit timer includes:
battery status, diagnostic information, entry events, and room temperature.

14. The sending peripheral of claim 12, wherein:
the event occurrence includes a door unlocked, a door locked, a door opened, a door closed, or a privacy lock enabled.

15. The sending peripheral of claim 9, wherein:
the desired stream direction is downstream and the destination peripheral has a hop count greater than a hop count of the sending peripheral.

16. The sending peripheral of claim 9, wherein:
the desired stream direction is upstream and the destination peripheral has a hop count less than a hop count of the sending peripheral.

17. The sending peripheral of claim 9, wherein:
the sending peripheral is a door lock, a wireless signal repeater, a thermostat, or a room management system.

18. The sending peripheral of claim 9, wherein:
the unique identifier indicates a type of device.

19. The sending peripheral of claim 18, wherein the type of device is at least one of a door lock, a wireless signal repeater, a thermostat, or a room management system.

\* \* \* \* \*